US008866770B2

(12) United States Patent
Ma

(10) Patent No.: US 8,866,770 B2
(45) Date of Patent: Oct. 21, 2014

(54) METHOD, DEVICE, AND COMPUTER-READABLE MEDIUM FOR CHANGING SIZE OF TOUCH PERMISSIBLE REGION OF TOUCH SCREEN

(75) Inventor: Tak-Man Ma, NT (HK)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 78 days.

(21) Appl. No.: 13/424,369

(22) Filed: Mar. 19, 2012

(65) Prior Publication Data

US 2013/0241842 A1    Sep. 19, 2013

(51) Int. Cl.
*G06F 3/041* (2006.01)
(52) U.S. Cl.
USPC ......................................................... 345/173
(58) Field of Classification Search
CPC ...... G06F 3/041; G06F 3/0416; G06F 3/0484
USPC .............................. 345/173–176; 348/333.01
See application file for complete search history.

(56) References Cited

U.S. PATENT DOCUMENTS

| 2009/0249235 | A1 | 10/2009 | Kim |
| 2010/0134433 | A1* | 6/2010 | Miyanishi ...................... 345/173 |
| 2010/0162182 | A1 | 6/2010 | Oh |
| 2010/0182264 | A1* | 7/2010 | Hahn et al. ..................... 345/173 |
| 2010/0302016 | A1* | 12/2010 | Zaborowski ............... 340/407.2 |
| 2011/0063491 | A1* | 3/2011 | Kim et al. ................ 348/333.01 |
| 2012/0044164 | A1 | 2/2012 | Kim |

OTHER PUBLICATIONS iPad User Guide for IOS 5.1 Software, Mar. 15, 2012, pp. 1-144, XP055094287, URL:http://manuals.info.apple.com/MANUALS/1000/MA1632/en_US/ipad_ios5_user_guide.pdf.
Manuals, iPad, Apple-Support-Manuals, Dec. 19, 2013, XP055094420, URL:http://support.apple.com/manuals/#ipad.

* cited by examiner

*Primary Examiner* — Andrew Sasinowski
(74) *Attorney, Agent, or Firm* — Winston Hsu; Scott Margo

(57) ABSTRACT

An embodiment provides a method of controlling a touch screen. The touch screen displays an interactive frame within a touch permissible region. Under the method, the touch screen can be switched from a normal state into a shrunk state. When the touch screen is in the shrunk state, the touch permissible region is confined to a sub-region of the touch screen. In contrast, when the touch screen is in the normal state, the touch permissible region extends beyond the sub-region.

32 Claims, 5 Drawing Sheets

METHOD, DEVICE, AND COMPUTER-READABLE MEDIUM FOR CHANGING SIZE OF TOUCH PERMISSIBLE REGION OF TOUCH SCREEN

BACKGROUND

1. Technical Field

The invention relates generally to a touch screen, and more particularly, to a method, device, and computer-readable medium for changing the size of a touch permissible region of a touch screen.

2. Related Art

A touch screen is an electronic component that can display a frame of image and in the meantime detect the presence and location of a touch made by a living body. Because touch screens facilitate user-machine interaction that is not only convenient but also intuitive, they are widely applied in various kinds of electronic devices.

Under some circumstances, a user may find the use of a touch screen less convenient. For example, the user of a large-screen smart phone may be unable to reach some portion of the phone's touch screen if the user is holding the phone with only the right/left hand and manipulating the touch screen with only the right/left thumb. As another example, the user of a large-screen touch TV may find it difficult to reach some portion of the touch screen without taking one or a few steps. As still another example, a touch screen may have some dead points and as a result some interactions involving these dead points will become unavailable.

SUMMARY

Embodiments of the invention provide a method of controlling a touch screen. The touch screen displays an interactive frame within a touch permissible region. Under the method, the touch screen can be switched from a normal state into a shrunk state. When the touch screen is in the shrunk state, the touch permissible region is confined to a sub-region of the touch screen. In contrast, when the touch screen is in the normal state, the touch permissible region extends beyond the sub-region.

Furthermore, the embodiments also provide an electronic device that includes the aforementioned touch screen and uses the aforementioned method to control the touch screen. In addition, the embodiments further provide a computer-readable medium storing a computer program that is codified with the aforementioned method.

Other features of the present invention will be apparent from the accompanying drawings and from the detailed description which follows.

BRIEF DESCRIPTION OF THE DRAWINGS

The invention is fully illustrated by the subsequent detailed description and the accompanying drawings.

DETAILED DESCRIPTION

Figure 1:
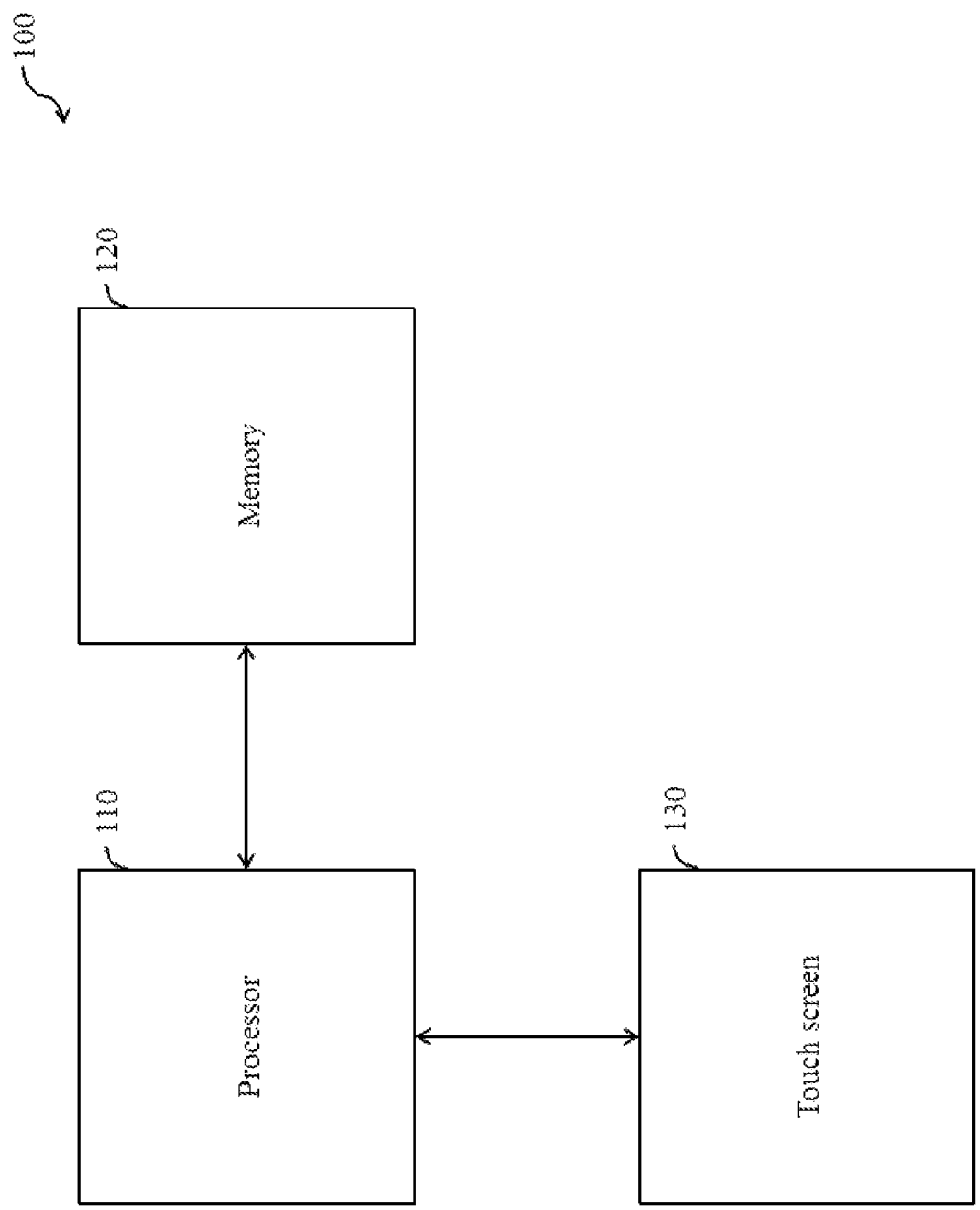
FIG. 1 shows a simplified block diagram of an electronic device according to an embodiment of the invention.

FIG. 1 shows a simplified block diagram of an electronic device 100 according to an embodiment of the invention. As some examples, the electronic device 100 can be a smart phone, a tablet computer, a computer monitor, a personal digital assistant (PDA), a satellite navigation device, a handhold gaming device, or a television (TV). The electronic device 100 of this embodiment includes at least a processor 110, a memory 120, and a touch screen 130. The touch screen 130 can be an integrated component or an external component of the electronic device 100.

The memory 120 stores codes of an operating system (OS) program and some application programs, and some other data. The processor 110 executes the OS program and the application programs to control the operations of the electronic device 100. The touch screen 130 is an input/output (I/O) interface through which the electronic device 100 displays image frames to the user and receives touch instructions from the user. In addition to the three depicted components, the electronic device 100 can further include some other components, such as other components that interconnect or assist the interactions between the three depicted components, other I/O interfaces that allow the electronic device 100 to communicate with the outside world, and other components of other functions. These other components are omitted from FIG. 1 to avoid distraction.

The touch screen 130 has a touch permissible region, i.e. a region within which the touch screen 130 displays an interactive frame. The interactive frame is a frame of image that can contain one or more touchable portions at which the electronic device 100 is defined to be able to response to a touch operation made by a user of the electronic device 100. In other words, when the user touches a touchable portion of the frame of image, the electronic device 100, in response to the touch operation, is controlled to react to the user's input/touch. For example, a touchable portion can be a user-interface object such as an icon, a virtual button, or a virtual knob. As another example, a touchable portion can be a virtual writing/drawing pad on which the user can write/draw. An interactive frame needs not be entirely touchable. For example, an interactive frame can have a background image and at least one user-interface object overlaid thereon, wherein the background image can be a wall paper or a blank background. The portions of the interactive frame that are not occupied by the user-interface objects can be untouchable portions. For example, when the electronic device 100 is locked, an interactive frame displayed thereon may include an icon or an unlock image that occupies only a limited portion of the touch screen 130. The rest of the interactive frame can be an untouchable portion and be either blank or occupied by a part of a background image.

The touch screen 130 of this embodiment has a normal state and a shrunk state. For example, the shrunk state can be a special state of the touch screen 130, under which the electronic device 100 confines the touch permissible region to a sub-region of the touch screen 130. In addition, the normal state can be a default state of the touch screen 130, under which the electronic device 100 allows the touch permissible region to extend beyond the sub-region. For example, when the touch screen 130 is in the normal state, the touch permissible region can coincide with a full-region of the touch screen 130.

When the touch screen 130 is in the shrunk state, the area outside the sub-region can be a blank area or be occupied by a part of a background image. If a background image exists in the area outside of the sub-region, the interactive frame displayed within the sub-region can be overlaid on the background image, like an on screen display (OSD). If a user touches the un-overlaid portion of the background image, the electronic device 100 does not respond to the user's touch. To put it differently, if the interactive frame is originally of the full size of the touch screen 130, i.e. the size of the full-region, the electronic device 100 first shrinks the interactive frame into the size of the sub-region, then overlays the shrunk interactive frame on the background image to create the displayed image frame with a size of the full region of the touch screen 130. The displayed image frame is displayed on the touch screen 130 so that the interactive frame, which has been shrunk already, is confined within the sub-region.

If a frame to be displayed is not interactive in nature, e.g. the frame is a read-only image that contains no user-interface objects, no embedded hyperlinks, and no editable areas, the electronic device 100 can have the touch screen 130 display the frame in the full-region regardless of whether the touch screen 130 is in the normal or the shrunk state. For example, such a frame can be a video frame or, an image frame provided by a screensaver, a page of a plain electronic book, or a photo image. Alternatively, the electronic device 100 can have the touch screen 130 display the non-interactive frame in the full-region if the touch screen 130 is in the normal state and in the sub-region if the touch screen 130 is in the shrunk state.

Figure 2:
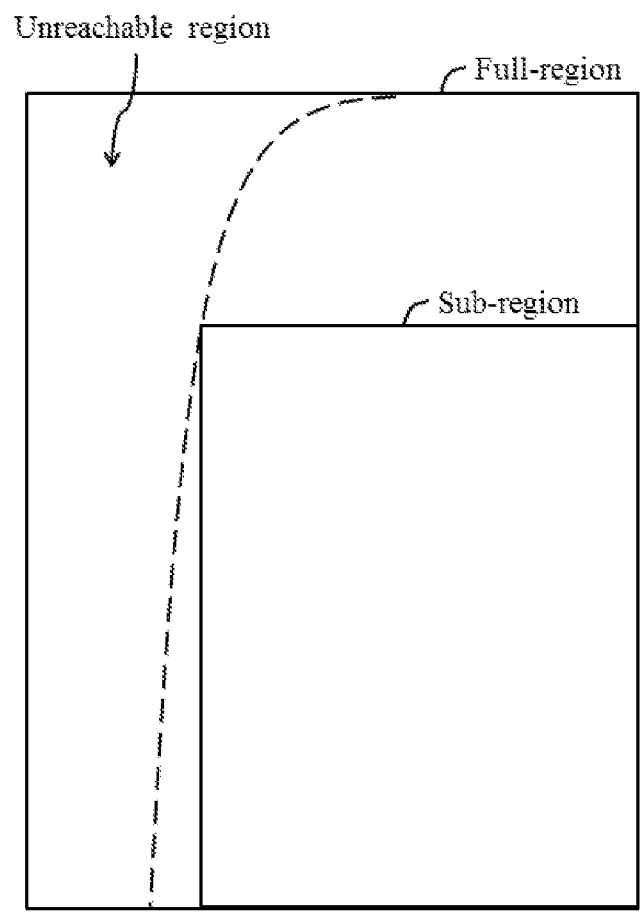
FIG. 2 shows a schematic diagram of an exemplary setting of a sub-region of the touch screen of FIG. 1.

The user of the electronic device 100 can set whether the touch screen 130 can be switched between the normal state and the shrunk state. Furthermore, the electronic device 100 can be configured to allow the user to pre-set the orientation, location, and size of the sub-region and the conditions of switching. FIG. 2 shows a schematic diagram of an exemplary setting of the sub-region of the touch screen 130 of FIG. 1. This example is based on the assumptions that the electronic device 100 is a handhold device, the user is right-handed, and the user sometimes holds the electronic device 100 with the right hand and manipulates the touch screen 130 with only the right thumb. In FIG. 2, the large rectangle represents the full-region of the touch screen 130. When the user is holding the electronic device 100 with the right hand, the user's right thumb is able to reach the region on right side of the touch screen 130 defined by a broken curve, but is unable to reach the region on the left side of the touch screen 130 defined by the broken curve. The user's left hand may be unavailable in the meantime, e.g. because it is holding/grabbing another thing such as an umbrella, a handbag, or a handrail. To facilitate one hand manipulation of the touch screen 130, the user can pre-set the sub-region so that it's on the lower right corner of the full-region, and to the extent the upper left corner of the sub-region is on the broken curve or on the right side of the broken curve. The electronic device 100 may require the user to pre-set the sub-region only once or set the sub-region every time the user wants to switch the touch screen 130 from the normal state to the shrunk state.

Figure 3:
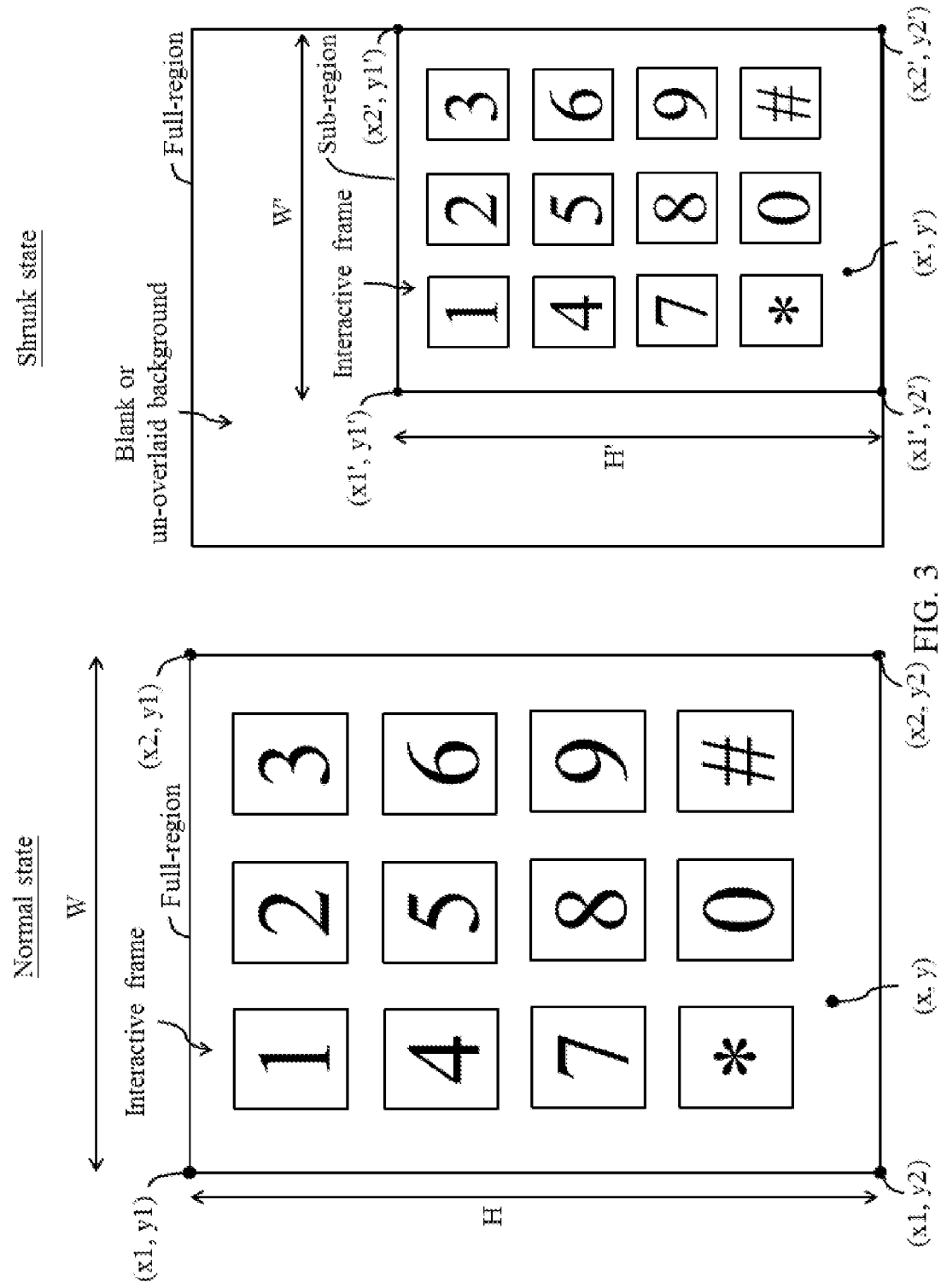
FIG. 3 shows two schematic diagrams comparing how an interactive frame is displayed on the touch screen of FIG. 1 in a normal and a shrunk state.

FIG. 3 shows two schematic diagrams comparing how an interactive frame is displayed on the touch screen 130 of FIG. 1 in the normal and shrunk states. Regardless of how the shrunk state is realized, in the shrunk state the perception of the user may be that an interactive frame has been shrunk from the size of the full-region into the size of the sub-region and placed within the sub-region. If the user is holding the electronic device 100 with the right hand and manipulating the touch screen 130 with only the right thumb, the user can reach all the virtual buttons displayed on the touch screen 130 when it's in the shrunk state. In contrast, if the touch screen 130 is in the normal state, the user's right thumb won't be able to reach the virtual button of number 1. As a result, confining the interactive frame within the sub-region can facilitate the user's one hand manipulation of the touch screen 130.

As shown in FIG. 3, a point displayed on coordinates (x, y) when the touch screen 130 is in the normal state will instead be displayed on coordinates (x', y') when the touch screen 130 is in the shrunk state. The coordinates (x, y) lies within a normal coordinate system defined by four corner points (x1, y1), (x2, y1), (x1, y2), and (x2, y2). The normal coordinate system corresponds to the full-region of the touch screen 130; (x2−x1) and (y2−y1) are equal to the width W and height H of the full-region, respectively. The coordinates (x', y') lies within a shrunk coordinate system defined by four corner points. (x1', y1'), (x2', y1'), (x1', y2'), and (x2', y2') The shrunk coordinate system corresponds to the sub-region of the touch screen 130; (x2'−x1') and (y2'−y1') are equal to the width W' and height H' of the sub-region, respectively. For example, in FIG. 3, the corner points (x2, y2) and (x2', y2') are on the same location of the touch screen 130. In other words, x2 equals to x2', and y2 equals to y2'.

If the OS program of the electronic device 100 is designed to support touch screens with different sizes, in the shrunk state the electronic device 100 can disable the pixels outside the sub-region, treat the touch screen 130 as if the sub-region constitutes a full-region, and drive the touch screen 130 accordingly. For example, if the size of the touch screen is 4.2 inches and the size of the sub-region is 3.2 inches and the OS program supports both 4.2-inch and 3.2-inch touch screens, in the shrunk state the electronic device 100 can confine an interactive frame within the sub-region by driving the touch screen 130 as if it's a 3.2-inch touch screen.

Figure 4:
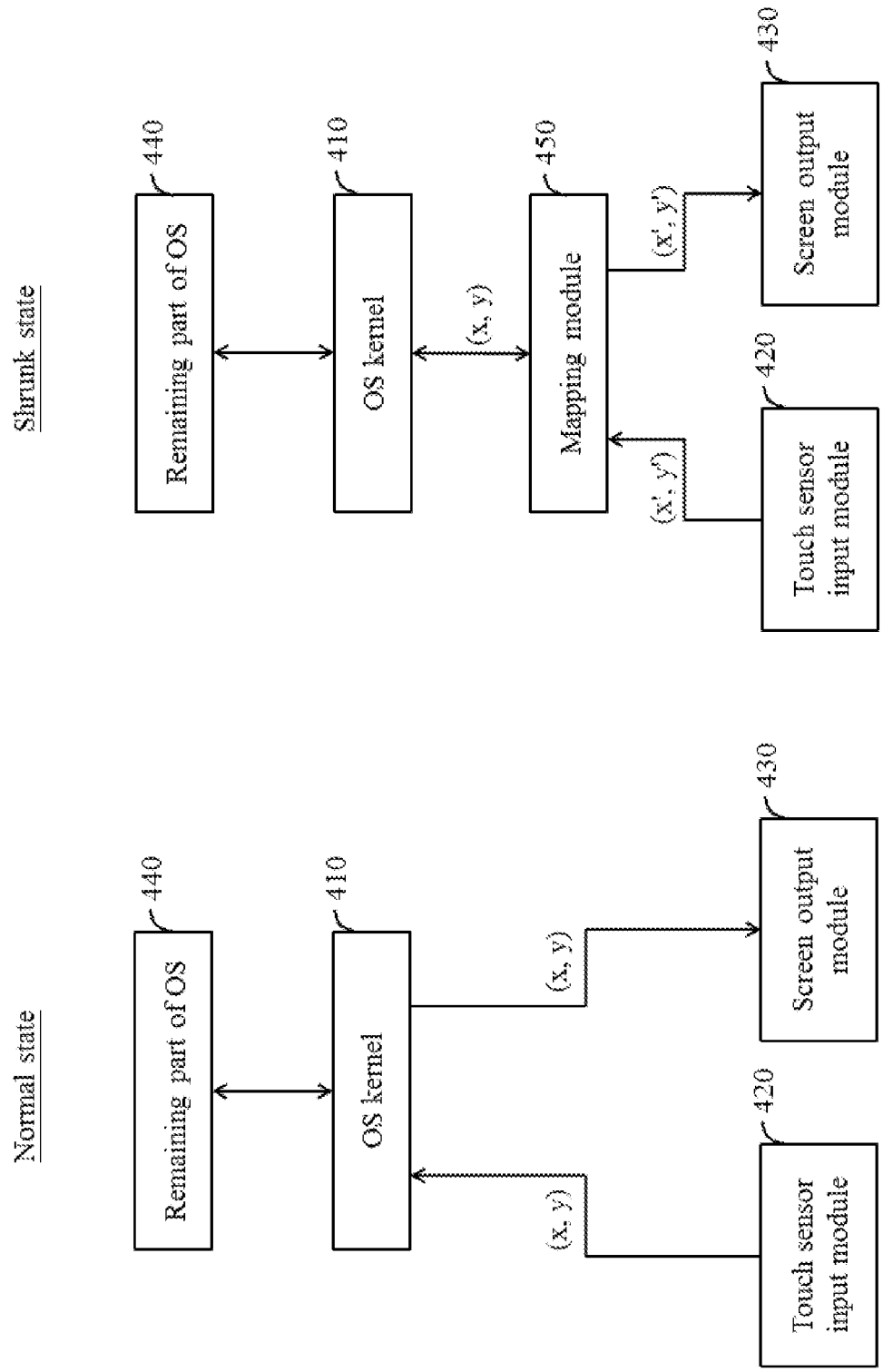
FIG. 4 shows two schematic diagrams of the operating system (OS) program of the electronic device of FIG. 1 when the touch screen of FIG. 1 is in the normal and the shrunk states.

As an alternative, in the shrunk state the OS program can performs coordinate transformation in order to transform a pair of coordinates (x, y) on the normal coordinate system into a pair of corresponding coordinates (x', y') on the shrunk coordinate system, and vice versa. FIG. 4 shows two schematic diagrams of the OS program of the electronic device 100 when the touch screen 130 is in the normal and shrunk states. The OS program has an OS kernel 410 that is responsible for, among other duties, providing core system services and interacting with a touch sensor input module 420, a screen output module 430, and a remaining part 440 of the OS program. The touch sensor input module 420 can be a driver that drives the touch screen 130 to detect touches; the screen output module 430 can be a driver that drives the touch screen 130 to display frames of images successively.

When the touch screen 130 is in the normal state, the OS kernel 410, the touch sensor input module 420, and the screen output module 430 all uses the normal coordinate system and there may be no need for coordinate transformation. When the touch screen 130 is in the shrunk state, the OS kernel 410 can keep using the normal coordinate system but in effect the touch sensor input module 420 and the screen output module 430 use the shrunk coordinate system instead. As a result, when the touch screen 130 is in the shrunk state, the OS program can further include a mapping module 450 for transforming each point (x, y) on the normal coordinate system into a corresponding point (x', y') on the shrunk coordinate system, and vice versa.

Specifically, the mapping module 450 transforms display coordinates from the normal coordinate system to the shrunk coordinate system. For example, when the OS kernel 410 wants a pixel to be displayed on point (x, y) of the normal coordinate system, the mapping module 450 will transform the location into (x', y') on the shrunk coordinate system so that the screen output module 430 can drive the touch screen 130 to display that pixel on point (x', y'). In effect, the mapping module 430 shrinks an interactive frame from the size of the full-region into the size of the sub-region and confines the shrunk interactive frame to the sub-region. Using FIG. 3 as an example, the coordinate transformation can be performed based on the following equations:

$$x'=(x-x1)\cdot(W'/W)+x1'$$

$$y'=(y-y1)\cdot(H'/H)+y1'$$

Furthermore, the mapping module 450 transforms touch sensor coordinates from the shrunk coordinate system to the normal coordinate system. For example, when the touch screen 130 informs the touch sensor input module 420 that a touch has been detected on point (x', y'), the mapping module 450 will transform the location into (x, y) on the normal coordinate system and inform the OS kernel 410 a touch has been detected on point (x, y). Using FIG. 3 as an example, the coordinate transformation can be performed based on the following equations:

$$x=(x'-x1')\cdot(W/W')+x1$$

$$y=(y'-y1')\cdot(H/H')+y1$$

Figure 5:
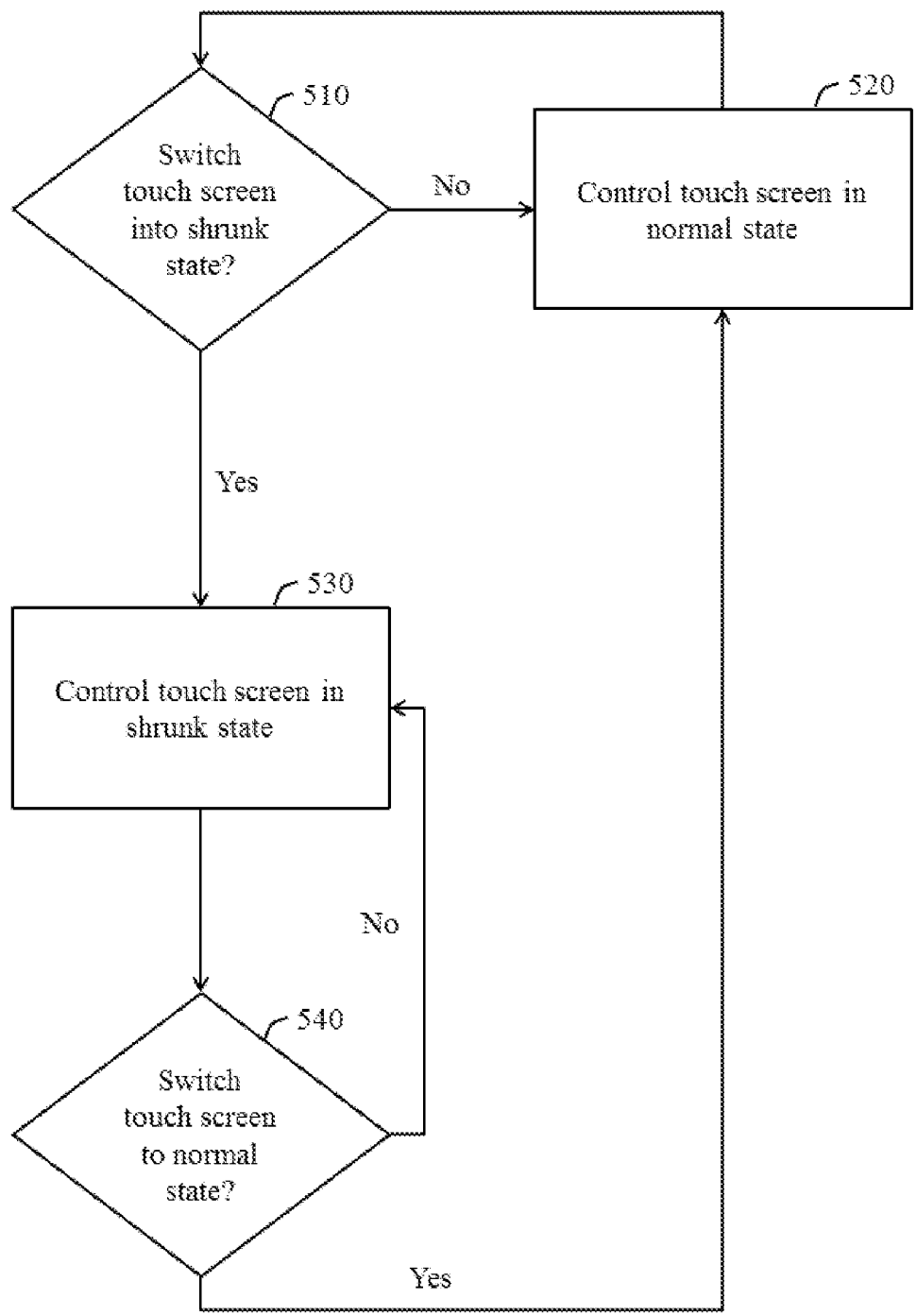
FIG. 5 shows a flowchart of an exemplary method of controlling the touch screen of FIG. 1.

FIG. 5 shows a flowchart of an exemplary method of controlling the touch screen 130. At step 510, the electronic device 100 first determines whether a set of condition(s) for switching the touch screen 130 from the normal state to the shrunk state is satisfied. If the set of condition(s) is not satisfied, the electronic device 100 enters step 520; otherwise, the electronic device 100 enters step 530.

For example, the set of condition(s) may include: (1) the user has activated the screen-shrink function (so that the touch screen 130 is allowed to be switched from the normal state to the shrunk state); and (2) the electronic device 100 has detected a trigger event. If the electronic device 100 is a handhold device, the detection of the trigger event may indicate that the user is holding and manipulating the electronic device 100 with only one hand. For example, the trigger event may be that the user unlocks the electronic device 100 with a first gesture. In such an example, whenever the electronic device 100 is locked, the electronic device 100 may allow the user to use either the first or a second unlock gesture to unlock the electronic device 100. The first unlock gesture allows the user to unlock the electronic device 100 and switch the touch screen 130 to the shrunk state. The second unlock gesture allows the user to unlock the electronic device 100 and maintain the touch screen 130 at the normal state.

As another example, the trigger event may be that the orientation of the electronic device 100 lies within a specific range when the user turns on the electronic device 100 or unlocks electronic device 100. In such an example, the electronic device 100 needs to have an electronic gyroscope, e.g. MEMS gyroscope, or 3D accelerometers in order to determine the orientation. Furthermore, the user may need to preset the specific range. One of the rationales behind this example is that the detected orientation may indicate whether the user is holding the electronic device 100 with only one hand or with both hands. In still another example, the trigger event is that the user specifically instructs the electronic device 100 to switch the touch screen 130 to the shrunk state.

At step 520, the electronic device 100 controls the touch screen 130 at the normal state and allows the full-region of the touch screen 130 to serve as the touch permissible region. Specifically, the electronic device 100 maintains the touch screen 130 in the normal state if it's already in the normal state or switches the touch screen 130 to the normal state if it's in the shrunk state. Since the normal state can be a default state of the touch screen 130, when the touch screen 130 is in this state, the electronic device 100 may drive it normally without performing other additional/special operations. For example, when the touch screen 130 is in the normal state, the electronic device 100 may display an interactive frame on the full-region of the touch screen 130 without first shrinking the interactive frame.

At step 530, the electronic device 100 controls the touch screen 130 at the shrunk state and confines the touch permissible region to the sub-region. Specifically, the electronic device 100 switches the touch screen 130 to the shrunk state if it's in the normal state or maintains the touch screen 130 in the shrunk state if it's already in the shrunk state. Since the shrunk state can be a special state of the touch screen 130, when the touch screen 130 is in this state, the electronic device 100 may need to perform some additional/special operations. For example, as mentioned above, the electronic device 100 can treat the sub-region as a full-region of the touch screen 130, and drive the touch screen 130 accordingly. As another example, the electronic device 100 can perform coordinate transformation in order to confine a displayed interactive frame within the sub-region.

At step 540, the electronic device 100 determines whether another set of condition(s) for switching the touch screen 130 from the shrunk state to the normal state is satisfied. If the set of condition(s) is not satisfied, the electronic device 100 returns to step 530; otherwise, the electronic device 100 enters step 520.

The set of condition(s) may include the detection of a trigger event. For example, the trigger event may be that the electronic device 100 has been locked, whether automatically or manually. As another example, the trigger event may be that the user unlocks the electronic device 100 using the second one of the aforementioned two unlock gestures. In a third example, the trigger event may be that the orientation of the electronic device 100 does not lie within the aforementioned specific range when the user turns on the electronic device 100 or unlocks the electronic device 100. In a fourth example, the trigger event is that the user specifically instructs the electronic device 100 to switch the touch screen 130 to the normal state, e.g. by manipulating (such as touching) a screen-expansion image displayed on the touch screen 130 when it's in the shrunk state. To facilitate the fourth example, the electronic device 100 can control the touch screen 130 to additionally display the screen-expansion image whenever the touch screen 130 is in the shrunk state.

The aforementioned shrunk state can facilitate the user's use the touch screen 130. For example, the shrunk state can make the use more convenient if the electronic device 100 is a large-screen smart phone that the user is holding with only the right/left hand and manipulating with only the right/left thumb. As another example, the shrunk state can make the use more convenient if the electronic device 100 is a large-screen touch TV and the user wants to stand still in using the touch screen 130. As still another example, the shrunk state can make the use more convenient if the touch screen 130 has some dead points and it happens that the user needs to use some of the dead points to interact with the electronic device 100. Specifically, the shrunk state allows a user-interface object of interest to the user to be relocated from a dead point to a normal point of the touch screen 130.

Any of the aforementioned control methods, or any combination thereof, can be codified into a computer program. The computer program can be stored in a computer readable medium, such as the memory 120 shown in FIG. 1. When being executed by the processor 110, the computer program can cause the electronic device 100 to perform the codified method(s).

In the foregoing detailed description, the invention has been described with reference to specific exemplary embodiments thereof. It will be evident that various modifications may be made thereto without departing from the spirit and scope of the invention as set forth in the following claims. The detailed description and drawings are, accordingly, to be regarded in an illustrative sense rather than a restrictive sense.

What is claimed is:

1. A method of controlling a touch screen of an electronic device, comprising:
   switching the touch screen from a normal state into a shrunk state; and
   confining a touch interactive region of the touch screen to a sub-region of the touch screen and positioning a non-interactive region of the touch screen away from a side of the touch screen contacted by a holding hand when the touch screen is in the shrunk state;
   wherein the touch interactive region is a region within which the touch screen displays an interactive frame, and when the touch screen is in the normal state, the touch interactive region extends beyond the sub-region.

2. The method of claim 1, wherein the confining step comprises:
   shrinking the interactive frame from a full size of the touch screen into a size of the sub-region; and
   displaying the shrunk interactive frame within the sub-region.

3. The method of claim 1, wherein the confining step comprises:
   treating the sub-region as a full-region of the touch screen and driving the touch screen accordingly.

4. The method of claim 1, wherein the confining step comprises:
   performing coordinate transformation between a shrunk coordinate system and a normal coordinate system;
   wherein the shrunk coordinate system corresponds to the sub-region of the touch screen and the normal coordinate system corresponds to a full-region of the touch screen.

5. The method of claim 4, wherein a relative position between each two contents within the interactive frame is unchanged after performing the coordinate transformation between the shrunk coordinate system and the normal coordinate system.

6. The method of claim 1, wherein the confining step comprises:
   transforming display coordinates from a normal coordinate system to a shrunk coordinate system; and
   transforming touch sensor coordinates from the shrunk coordinate system to the normal coordinate system;
   wherein the shrunk coordinate system corresponds to the sub-region of the touch screen and the normal coordinate system corresponds to a full-region of the touch screen.

7. The method of claim 1, further comprising:
   displaying a screen-expansion image on the touch screen when the touch screen is in the shrunk state;
   wherein the screen-expansion image is a user-interface object with which a user interacts in order to switch the touch screen from the shrunk state into the normal state.

8. The method of claim 1, wherein the step of switching the touch screen from the normal state into the shrunk state comprises:
   detecting a trigger event for transitioning the electronic device from an idle state to an operation state, wherein the trigger event comprises a specific unlock gesture; and
   determining whether to switch the touch screen from the normal state into the shrunk state according to the trigger event.

9. The method of claim 1, further comprising:
   detecting whether an orientation of the touch screen lies within a specific range in order to determining whether to switch the touch screen from the normal state into the shrunk state.

10. The method of claim 1, wherein when the touch interactive region of the touch screen is confined to the sub-region, each operation object displayed on the touch screen is reachable by a thumb of a hand determined to be holding the electronic device.

11. The method of claim 1, wherein a boundary of the sub-region is determined according to a region on the touch screen reachable by a finger of a hand determined to be holding the electronic device.

12. The method of claim 1, wherein the sub-region for providing a user interaction ability is determined by a touch operation performed by a single hand determined to be holding the electronic device, in which the user interaction ability is identical before and after switching the touch screen from the normal state into the shrunk state.

13. An electronic device, comprising:
   a memory;
   a touch screen; and
   a processor, configured to execute a computer program stored in the memory to:
      switch the touch screen from a normal state into a shrunk state; and
      confine a touch interactive region of the touch screen to a sub-region of the touch screen and position a non-interactive region of the touch screen away from a side of the touch screen contacted by a holding hand when the touch screen is in the shrunk state;
   wherein the touch interactive region is a region within which the touch screen displays an interactive frame, and when the touch screen is in the normal state, the touch interactive region extends beyond the sub-region.

14. The device of claim 13, wherein the processor is further configured to:
   shrink the interactive frame into a size of the sub-region; and
   control the touch screen to display the shrunk interactive frame within the sub-region.

15. The device of claim 13, wherein the processor is further configured to:
   treat the sub-region as a full-region of the touch screen and drive the touch screen accordingly.

16. The device of claim 13, wherein the processor is further configured to:
   perform coordinate transformation between a shrunk coordinate system and a normal coordinate system;
   wherein the shrunk coordinate system corresponds to the sub-region of the touch screen and the normal coordinate system corresponds to a full-region of the touch screen.

17. The electronic device of claim 16, wherein a relative position between each two contents within the interactive frame is unchanged after performing the coordinate transformation between the shrunk coordinate system and the normal coordinate system.

18. The device of claim 13, wherein the processor is further configured to:
    transform display coordinates from a normal coordinate system to a shrunk coordinate system; and
    transform touch sensor coordinates from the shrunk coordinate system to the normal coordinate system;
    wherein the shrunk coordinate system corresponds to the sub-region of the touch screen and the normal coordinate system corresponds to a full-region of the touch screen.

19. The device of claim 13, wherein the processor is further configured to:
    control the touch screen to display a screen-expansion image when the touch screen is in the shrunk state;
    wherein the screen-expansion image is a user-interface object with which a user interacts in order to switch the touch screen from the shrunk state into the normal state.

20. The electronic device of claim 13, wherein when the touch interactive region of the touch screen is confined to the sub-region, each operation object displayed on the touch screen is reachable by a thumb of a hand determined to be holding the electronic device.

21. The electronic device of claim 13, wherein a boundary of the sub-region is determined according to a region on the touch screen reachable by a finger of a hand holding the electronic device.

22. The electronic device of claim 13, wherein the sub-region for providing a user interaction ability is determined by a touch operation performed by a single hand holding the electronic device, in which the user interaction ability is identical before and after switching the touch screen from the normal state into the shrunk state.

23. A non-transitory computer-readable medium storing a computer program which, when executed by an electronic device comprising a touch screen, causes the electronic device to perform operations comprising:
    switching the touch screen from a normal state into a shrunk state; and
    confining a touch interactive region of the touch screen to a sub-region of the touch screen and positioning a non-interactive region of the touch screen away from a side of the touch screen contacted by a holding hand when the touch screen is in the shrunk state;
    wherein the touch interactive region is a region within which the touch screen displays an interactive frame, and when the touch screen is in the normal state, the touch interactive region extends beyond the sub-region.

24. The non-transitory computer-readable medium of claim 23, wherein the confinement operation comprises:
    shrinking the interactive frame from a full size of the touch screen into a size of the sub-region; and
    displaying the shrunk interactive frame within the sub-region.

25. The non-transitory computer-readable medium of claim 23, wherein the confinement operation comprises:
    treating the sub-region as a full-region of the touch screen and driving the touch screen accordingly.

26. The non-transitory computer-readable medium of claim 23, wherein the confinement operation comprises:
    performing coordinate transformation between a shrunk coordinate system and a normal coordinate system;
    wherein the shrunk coordinate system corresponds to the sub-region of the touch screen and the normal coordinate system corresponds to a full-region of the touch screen.

27. The non-transitory computer-readable medium of claim 26, wherein a relative position between each two contents within the interactive frame is unchanged after performing the coordinate transformation between the shrunk coordinate system and the normal coordinate system.

28. The non-transitory computer-readable medium of claim 23, wherein the confinement operation comprises:
    transforming display coordinates from a normal coordinate system to a shrunk coordinate system; and
    transforming touch sensor coordinates from the shrunk coordinate system to the normal coordinate system;
    wherein the shrunk coordinate system corresponds to the sub-region of the touch screen and the normal coordinate system corresponds to a full-region of the touch screen.

29. The non-transitory computer-readable medium of claim 23, wherein the operations further comprise:
    displaying a screen-expansion image on the touch screen when the touch screen is in the shrunk state;
    wherein the screen-expansion image is a user-interface object with which a user interacts in order to switch the touch screen from the shrunk state into the normal state.

30. The non-transitory computer-readable medium of claim 23, wherein when the touch interactive region of the touch screen is confined to the sub-region, each operation object displayed on the touch screen is reachable by a thumb of a hand determined to be holding the electronic device.

31. The non-transitory computer-readable medium of claim 23, wherein a boundary of the sub-region is determined according to a region on the touch screen reachable by a finger of a hand holding the electronic device.

32. The non-transitory computer-readable medium of claim 23, wherein the sub-region for providing a user interaction ability is determined by a touch operation performed by a single hand holding the electronic device, in which the user interaction ability is identical before and after switching the touch screen from the normal state into the shrunk state.

\* \* \* \* \*